United States Patent [19]

Köbler et al.

[11] Patent Number: 4,487,124
[45] Date of Patent: Dec. 11, 1984

[54] SHOCK AND OSCILLATION REDUCING APPARATUS FOR PRINTING MACHINE CYLINDERS

[75] Inventors: Ingo Köbler, Anhausen; Herbert Stöckl, Augsburg; Peter Meinke, Steinbach; Albert Engl, Warngau; Hatto Hechler, Augsburg, all of Fed. Rep. of Germany

[73] Assignee: M.A.N. Roland Druckmaschinen Aktiengesellschaft, Offenbach am Main, Fed. Rep. of Germany

[21] Appl. No.: 521,655

[22] Filed: Aug. 10, 1983

[30] Foreign Application Priority Data

Aug. 13, 1982 [DE] Fed. Rep. of Germany ....... 3230118

[51] Int. Cl.$^3$ .............................................. B41F 5/00
[52] U.S. Cl. ..................................... 101/216; 101/219; 74/574
[58] Field of Search ................... 101/216, 219; 74/574, 74/604

[56] References Cited

U.S. PATENT DOCUMENTS

| | | |
|---|---|---|
| 1,896,292 | 2/1933 | Dorn ....................................... 74/574 |
| 2,103,643 | 12/1937 | Salomon ............................... 74/574 |
| 3,040,598 | 6/1962 | Warren ................................. 74/574 |
| 3,075,406 | 1/1963 | Butler, Jr. et al. ..................... 74/574 |
| 3,521,340 | 7/1970 | Gallant et al. ........................ 74/574 |
| 4,125,073 | 9/1978 | Bain . | |

FOREIGN PATENT DOCUMENTS 3012060 10/1981 Fed. Rep. of Germany ...... 101/216
2073368 10/1981 United Kingdom ............... 101/216

Primary Examiner—Edgar S. Burr
Assistant Examiner—John A. Weresh
Attorney, Agent, or Firm—Frishauf, Holtz, Goodman & Woodward

[57] ABSTRACT

To suppress shocks from being transferred to the walls of a cylinder (3) of a printing machine, when grooves (7) on the cylinder roll-off against another cylinder, and particularly against the edges of another groove (8) in an engaging cylinder, a damping mass (11) is filled within the cylinder which additionally retains an elastic shaft (12) on which an inertia mass (13) is secured. The inertia mass, preferably in form of a ball, is excentrally located on the elastic shaft (12) and touches at a point C the inner surface of the wall (10) of the cylinder (3) when the cylinder is in engagement with another one. The impact or shock, at the edge of the groove (7) rolls off against an engagement cylinder causes the inertia mass (13) to be accelerated towards the center of the cylinder, typically upwardly, and to place this mass into oscillations. These oscillations are damped by the damping mass (11) thus preventing transfer of oscillatory bending movement to the wall of the cylinder, and hence to a covering (5) thereon, which, for example, may be a printing rubber blanket, a printing plate, or the like.

14 Claims, 5 Drawing Figures

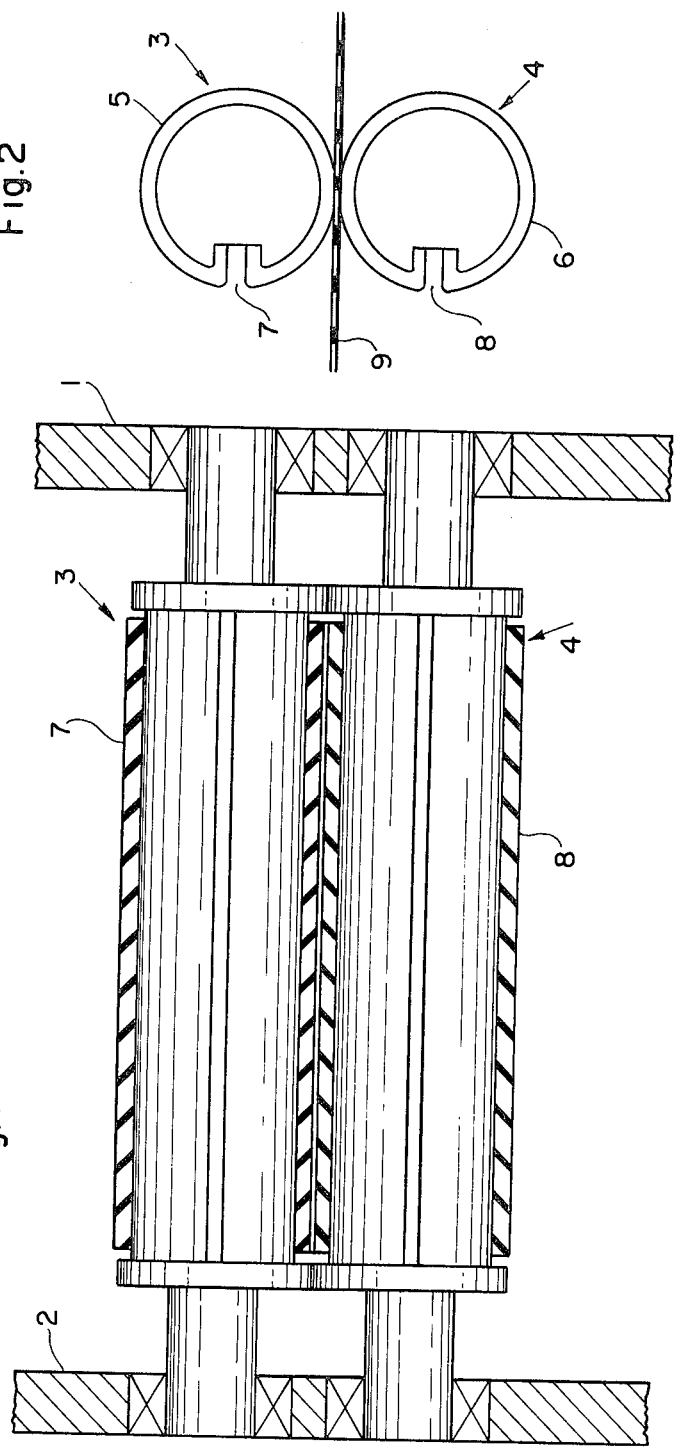

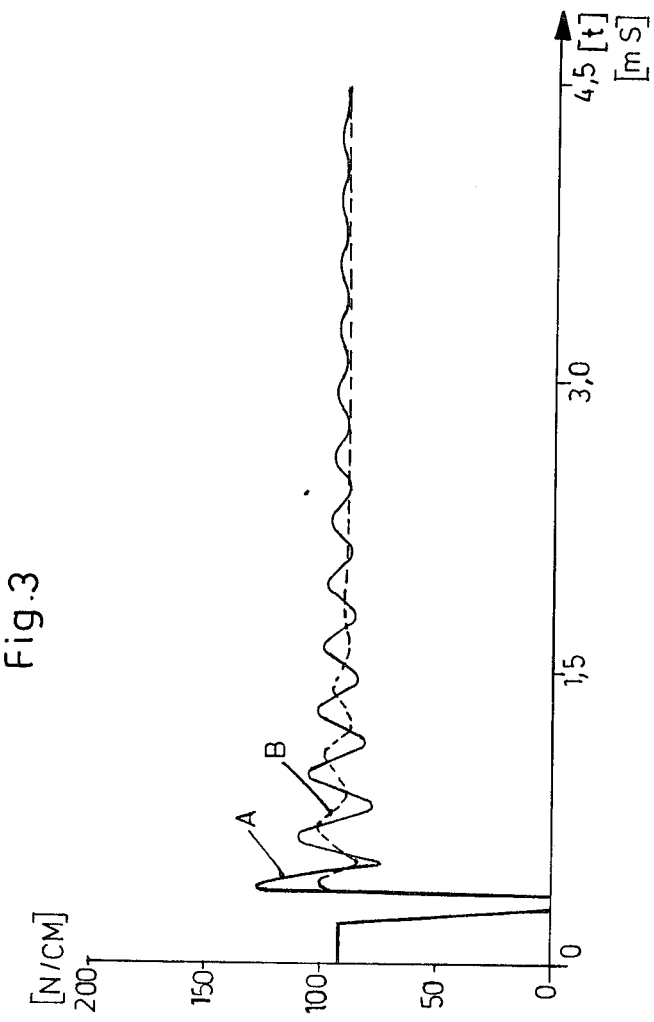

SHOCK AND OSCILLATION REDUCING APPARATUS FOR PRINTING MACHINE CYLINDERS

Reference to related U.S. Pat. No. 4,125,073.

The present invention relates to printing machines and more particularly to reduce the shock and oscillations which arise in printing machine cylinders when cylinders formed with a groove to retain a blanket, or printing plate thereon roll off against other cylinders, and more particularly against another cylinder which is formed with a similar groove.

BACKGROUND

It has previously been proposed to provide for damping of cylinders in printing machines as the cylinders roll off against each other and portions formed with grooves therein meet each other. Shocks will arise which result in bending oscillations of the printing machine cylinders. The damping system described in the referenced U.S. Pat. No. 4,125,073 is intended to reduce the amplitude of these bending oscillations so that they will attenuate rapidly. In accordance with the proposal, a ball fitted within a slit is eccentrically positioned in the cylinder. The ball, due to centrifugal force, will engage the inner wall of the cylinder. The ball is accelerated in the direction of the central axis of the cylinder due to the impact or shock to which the cylinder is subjected just after the groove has rolled off against an engaging cylinder. As the cylinder continues to rotate, centrifugal force again causes the ball to engage the inner wall of the cylinder. This occurs in advance of completion of the revolution of the cylinder, that is, in advance of the next roll-off event of the groove of the cylinder against an adjacent cylinder. It has been found that such an arrangement causes disturbances within the cylinder.

THE INVENTION

It is an object to provide an arrangement in which the amplitudes of bending oscillations are effectively reduced without causing disturbances within the interior of the respective cylinder of the printing system.

Briefly, an elastic shaft is located within the cylinder which, in general, is hollow. An inertia mass is secured to the elastic shaft, the inertia mass having a center of gravity located between the center axis of the cylinder and the inner surface of the wall of the cylinder, when the cylinder is at rest. The inertia mass is in contact with the surface of the wall when the cylinder is rotating. The inertia mass, as well as the elastic shaft are embedded in a damping mass which fills the interior of the cylinder to provide for damp, controlled movement of the inertia mass, as well as of the shaft to which it is connected within the interior of the cylinder and prevent uncontrolled disturbances from arising within the interior of the cylinder.

DRAWINGS

FIG. 1 is a schematic side view of two cylinders located between side walls of a printing machine;

FIG. 2 is a schematic end view of the cylinder of FIG. 1;

FIG. 3 is a graph of bending of a rotating printing cylinder, with respect to time;

DETAILED DESCRIPTION

Figure 4:
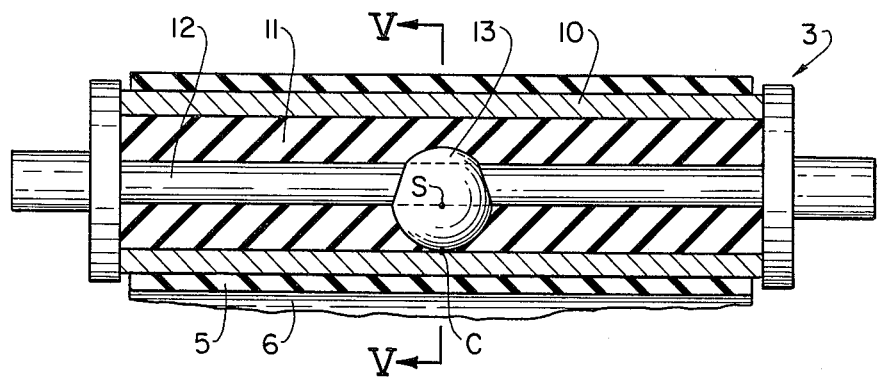
FIG. 4 is a longitudinal schematic cross-section through a cylinder damped in accordance with the present invention.

FIGS. 1 and 2 show, highly schematically, the arrangement of a pair of printing cylinders 3, 4, journaled in side walls 1, 2 of a printing machine. These cylinders are typical for rotary offset printing machines, and have, respectively, printing blankets 5, 6 secured to the circumferences thereof. The blankets are attached to the cylinders in attachment grooves 7, 8, as well known, and in accordance with any suitable clamping or attachment mechanism. As seen in FIG. 2, the cylinder arrangement as shown can provide for double sided printing on a paper web 9, the respective blanket cylinders forming carriers of printing information, as well as the respective impression of printing cylinders of the machine. The ends of the cylinder 3 may have bearer rings 3a, 4a secured thereto. In operation, the grooves 7, 8 of the cylinders will roll off against each other. The rubber blanket cylinders 3, 4 are pressed towards each other. As best seen in FIG. 3, and as the cylinders rotate, compressive force along the impression, or imprint or printing line will decrease and may drop to zero as the grooves are opposite each other—see FIG. 3. Upon further rotation of the cylinders, and after the cylinder grooves 7, 8, have passed each other, and the edges of the grooves meet each other, a substantial shock will result which may lead to disturbances within the printed image, for example striping or the like, as well as to premature damage and wear of the blankets, as well as the bearer rings 3a, 4a, if provided. The curve A of FIG. 3 illustrates the attenuation of the oscillations, with respect to time, which decay only gradually as the cylinder continues to rotate.

In accordance with the present invention, and in order to decrease the decaying oscillations as shown in FIG. 3, curve A, the cylinder 3 is fitted with an oscillation absorbing apparatus which includes a damping mass 11 located within the hollow interior of the cylinder 3. An elastic shaft or rod 12 is embedded within the damping mass 11. The shaft or rod 12 may have any suitable cross-section, for example circular, rectangular, square, elliptical or as desired. A fixed stiff inertia mass, for example in form of a ball 13 is eccentrically located on and secured to the elastic shaft 12. The elastic shaft 12 may extend from one end face of the cylinder to the other, and be secured to both of the end faces, for example to the bearer rings; alternatively, the elastic shaft or rod may be secured to only one of the end faces or end discs of the cylinder, or attached to the walls 10 of the cylinder by a cross-connecting element, or other suitable bracket. The essential feature is, however, to so secure the elastic shaft or rod 12 within the cylinder that the shaft or rod 12 presses enertia mass 13, preferably in form of a ball, elastically against the inner surface of the cylinder wall 10 of cylinder 3, as shown at C, FIG. 4, while being embedded within the damping mass 11.

The inertia mass 13, preferably in form of a ball, can be formed with a bore which is dimensioned to just receive the shaft or rod 12, for example by snugly retaining the shaft or rod 12, or being slightly press-fitted thereon.

Figure 5:
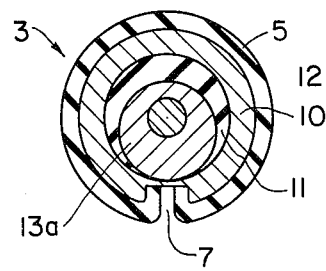
FIG. 5 is a cross-section along line V—V of FIG. 4 and illustrating another embodiment.

The ball 13 is preferably formed of metal, for example steel, and is so secured to the shaft 12 that it just touches the inner surface of the wall 10 of the cylinder 3 as seen at C when the cylinder 3 is in engagement with an adjacent cylinder 4—see FIGS. 1 and 2. If the cylinder 3 is removed from emgagement with an adjacent cylinder—for example by moving an eccentric shaft positioning element, as well known in the printing machinery field, it is not necessary that the ball 13 engage with the inner surface of the wall 10. In operation, and when the cylinders are in engagement, the center of gravity S of the ball 13 is positioned between the center line, or axis of the cylinder 3 and the inner surface of the wall 10. FIG. 5 shows the ball positioned just inwardly of the groove 7.

As the grooves 7, 8, roll off against each other, the shock which occurs upon the edge of the grooves meeting each other is transferred directly to the ball 13 so that it is upwardly—with respect to FIG. 4—accelerated. Similarly, the flexible or elastic shaft 12, which is rigidly connected with the ball 13 will be bent upwardly. The oscillations which are thus imparted to the ball 13 and the shaft 12 are dissipated within the damping mass 11. The uncontrolled bending oscillations illustrated in the solid line curve A of FIG. 3 are thus substantially attenuated and damped, so that, with the apparatus as described the oscillations will have essentially the shape as illustrated in the broken line curve B. As can be seen by comparison of curve A and B, the shock applied to the cylinder is reduced, and oscillations are attenuated more rapidly, so that oscillations occurring on the cylinder will decay quickly. Curve A shows the oscillations with respect to an undamped cylinder.

Various changes and modifications may be made; for example, FIG. 4 illustrates only a single ball located axially in the center of the cylinder 3. More than one such inertia ball may be located on the flexible, or elastic shaft 12, however.

The mass of the inertia mass 13, or the total mass of a plurality of such masses is so determined that the inherent oscillation of the oscillating system defined by the mass, or masses, and the elastic shaft 12 will have a predetermined frequency when triggered, or energized by the impact as a groove rolls off against another cylinder. Preferably, the predetermined frequency is identical to the inherent bending frequency of the cylinder, when subjected to the groove-edge shock.

The arrangement to dampen oscillations can be applied to the upper blanket cylinder 3, as shown schematically in FIGS. 1 and 4. The arrangement may, however, also be applied to the lower blanket cylinder 4, and/or to the plate cylinders cooperating with the blanket cylinders 3, 4, and not shown specifically in the drawings. The groove 7 has been omitted from the illustration of FIG. 4 for clarity. It may be formed in the usual manner and be supplied with customary clamping apparatus located, for example, at distributed axial positions within the cylinder 3 to clamp a blanket thereon. The damping coefficient of the damping mass 11, preferably, is: $d_m > 5 \times 10^4 [Ns/m]$.

Suitable materials for the inertia mass 11 are elastromers for example rubber based materials, gum arabic, or the like.

The inertia mass may, for example, have the shape of an ellipsoid 13a, see FIG. 5.

Various other changes and modifications may be made within the scope of the inventive concept.

We claim:

1. In a rotary printing machine having a hollow first cylinder (3) formed with a groove (7) to receive end portions of a covering (5) for the cylinder,
    a second cylinder (4) in surface engagement with the first cylinder,
    and an apparatus including a movable mass for reducing the shock on the first cylinder, when in operation, the groove of the first cylinder rolls over the second cylinder, comprising
    an elastic rod (12) located within the cylinder and secured at its axial ends to the cylinder;
    a solid inertia mass (13) secured to the elastic rod, through which the elastic rod extends such that the mass has a center of gravity (S) located between the center axis of the cylinder and the inner surface of said hollow cylinder (3), when said cylinder (3) is at rest and is held, by the elastic rod, in contact with said inner surface of the hollow cylinder when the cylinder (3) is rotating;
    and a damping mass (11) filling the interior of the hollow first cylinder (3) and embedding the elastic rod (12) and said inertia mass in said position in which the mass (13) is in contact engagement with the inner surface of the wall (10) of the cylinder (3).

2. Shock reducing means as claimed in claim 1 wherein said inertia mass (13) comprises a ball.

3. Shock reducing means as claimed in claim 1 wherein said inertia mass comprises an ellipsoid.

4. Shock reducing means as claimed in claim 1 wherein said inertia mass (13) is axially centrally located within the cylinder (3).

5. Shock reducing means as claimed in claim 1 wherein the damping mass (11) has a damping coefficient of $d_m > 5 \times 10^4 [Ns/m]$.

6. Shock reducing means as claimed in claim 1 wherein the cylinder has an end face or disc or cap;
    and said elastic rod (12) is secured to said end disc or cap.

7. Shock reducing means as claimed in claim 1 wherein said cylinder has an end disc or cap at both ends;
    and said elastic rod is centrally secured coextensive with the axis of said cylinder to both said end caps or discs.

8. Shock reducing means as claimed in claim 1, wherein the contact engagment (c) of the inertia mass with the inner surface of said hollow cylinder is radially inwardly of the groove (7).

9. Shock reducing means as claimed in claim 2, wherein the contact engagement (c) of the inertia mass with the inner surface of said hollow cylinder is radially inwardly of the groove (7).

10. Shock reducing means as claimed in claim 3, wherein the contact engagement (c) of the inertia mass with the inner surface of said hollow cylinder is radially inwardly of the groove (7).

11. Shock reducing means as claimed in claim 4, wherein the contact engagement (c) of the inertia mass with the inner surface of said hollow cylinder is radially inwardly of the groove (7).

12. Shock reducing means as claimed in claim 5, wherein the contact engagement (c) of the inertia mass with the inner surface of said hollow cylinder is radially inwardly of the groove (7).

13. Shock reducing means as claimed in claim 6, wherein the contact engagement (c) of the inertia mass with the inner surface of said hollow cylinder is radially inwardly of the groove (7).

14. Shock reducing means as claimed in claim 7, wherein the contact engagement (c) of the inertia mass with the inner surface of said hollow cylinder is radially inwardly of the groove (7).

* * * * *